United States Patent [19]
Pirovano

[11] 3,749,062
[45] July 31, 1973

[54] APPARATUS FOR THE AUTOMATIC DISTRIBUTION OF FEED

[76] Inventor: Camillo Pirovano, Via Spluga, Cernusco Lombardone (Como), Italy

[22] Filed: Mar. 18, 1971

[21] Appl. No.: 125,787

[30] Foreign Application Priority Data
Mar. 21, 1970 Italy..................22269A/70

[52] U.S. Cl............. 119/51 CF, 119/52 B, 119/61
[51] Int. Cl...................... A01k 05/00, A01k 39/00
[58] Field of Search...................... 119/51 CF, 52 B, 119/61, 52 AF, 56, 57, 58, 51

[56] References Cited
UNITED STATES PATENTS

| | | |
|---|---|---|
| 2,554,589 | 5/1951 | Patz et al.............. 119/51 CF UX |
| 3,586,155 | 6/1971 | Turrentine et al............. 119/51 CF |
| 3,313,273 | 4/1967 | Mitchell........................... 119/61 X |
| 2,794,421 | 6/1957 | Rose et al....................... 119/61 X |
| 2,652,808 | 9/1953 | Wagner.......................... 119/52 AF |
| 3,543,283 | 11/1970 | Cataline................................ 119/61 |

FOREIGN PATENTS OR APPLICATIONS
77,402  1/1962  France............................ 119/51 CF Primary Examiner—Russell R. Kinsey
Assistant Examiner—James H. Czerwonky
Attorney—Stevens, Davis, Miller & Mosher

[57] ABSTRACT

An apparatus for the automatic distribution of feed in zootechnical breeding farms, particularly chicken farms and the like, consists of a cable running in a seating formed on one side of a feedbox. A plurality of oblong fins are duly spaced one from the other along the cable, each being secured to the said cable at one extremity and extend unilaterally from it. The opposite extremity of the said fins run in a spaced seating formed on the other side of the said feedbox. The seatings substantially prevent rotation of the fins about the cable away from the bottom of the feedbox.

1 Claim, 3 Drawing Figures

PATENTED JUL 31 1973 3,749,062

APPARATUS FOR THE AUTOMATIC DISTRIBUTION OF FEED

The present invention concerns an apparatus for the automatic distribution of feed in zootechnical breeding farms, particularly chicken farms and the like, which apparatus comprises a cable which runs in a seating formed on one side of a feedbox, a plurality of duly spaced fins fixed at one end of the said cable and extending unilaterally aligned from the said cable, the opposite end of the said fins running in a seating formed on the other side of the feedbox.

So that there may be better understanding of the invention aforesaid, a description thereof is now given with reference to the annexed drawings, in which.

Figure 1:
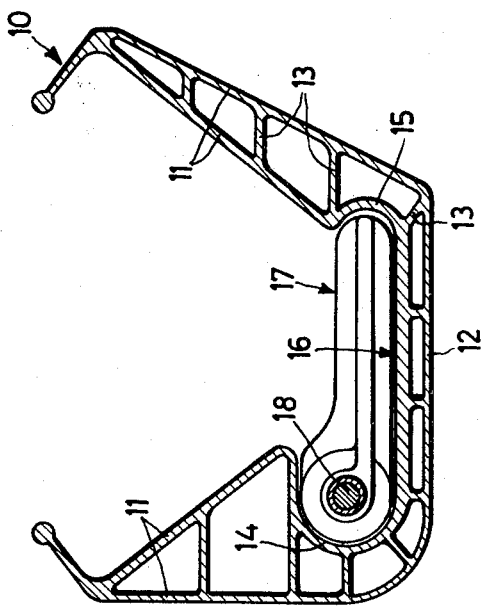
FIG. 1 is a sectional view illustrating an apparatus for the automatic distribution of feed according to the invention.

With reference to the FIG. 1 of the drawings, the apparatus embodied according to the invention comprises a feedbox, generally indicated with the numeral 10, consisting of a tubular profile, preferably but not necessarily in plastic material, having a polygonal cross section open on the upper side.

The said profile has double lateral walls 11 and a double bottom walls 12, which are joined by means of reinforcement ribbings 13. The said lateral walls 11 are connected to the said bottom wall 12 by curved portions 14 and 15, the which form, with the bottom wall 12, a runway 16.

Figure 2:
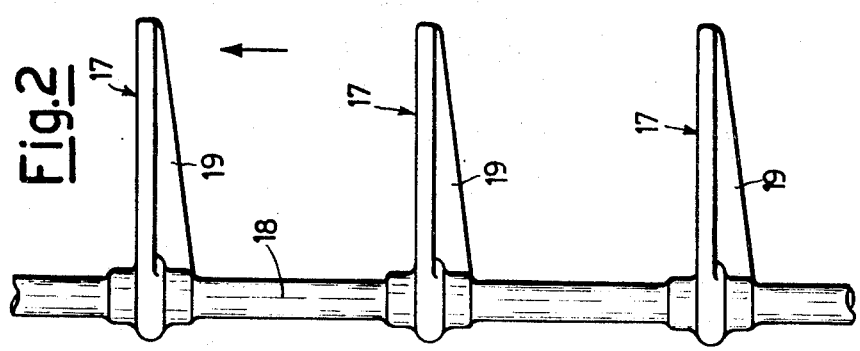
FIG. 2 is a plan view illustrating the cable with fins, which distributes the feed in the feedbox.

As the drawings clearly show, in the said runway 16 there are housed a plurality of fins 17 with reinforcement ribbings 19, which fins are secured, duly spaced equidistantly one from the other, to a cable 18 (FIG. 2), drawn for example by an electric engine. The cable 18 is of steel and the fins 17 in plastic material moulded directly onto the said cable.

As the FIG. 1 clearly shows, the curved portion 14 wholly covers the cable 18.

Figure 3:
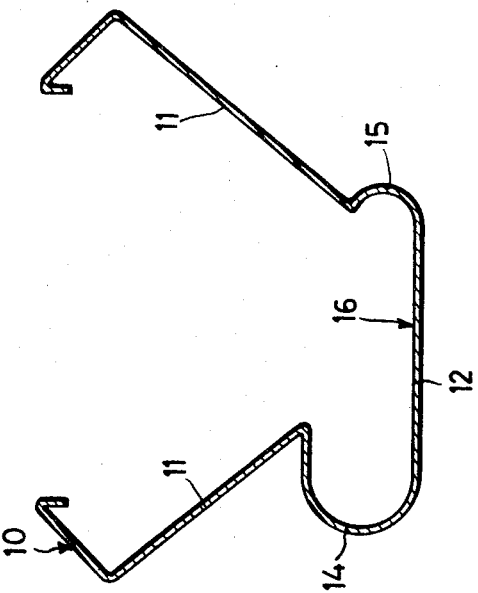
FIG. 3 is a sectional view illustrating another form of embodiment of the same apparatus.

The feedbox 10 could be in metal, and would in such case take on the configuration of FIG. 3.

During their passage in the feedbox in the direction of the arrow, the fins 17 take up the feed from one or more feeding hoppers and distribute it along the feedboxes, from where the hens or the like peck it up directly, the feed-boxes being open on their upper side.

The advantages deriving from such an apparatus can be summarized as follows:
high rate of distribution
silent running of the installation
cleanliness and hygiene of the breeding farm
no feed wastage.

What is claimed is:

1. Apparatus for the automatic distribution of feed comprising a feed box having lateral walls and a bottom wall, said lateral walls being joined to the bottom wall by curved portions to form spaced seatings on either side of the bottom wall, a cable posi-tioned within one of oblong said seatings, a plurality of fins spaced from each other along said cable, each fin being secured at one end thereof to said cable while the other end of each of said fins is positioned in the other of said seatings, each of said fins having a reinforcing rib, whereby said seatings substantially prevent said fins from rotating about.

* * * * *